Aug. 22, 1961   R. W. YOUNG   2,996,784
CURVED ROLLER
Filed June 30, 1959
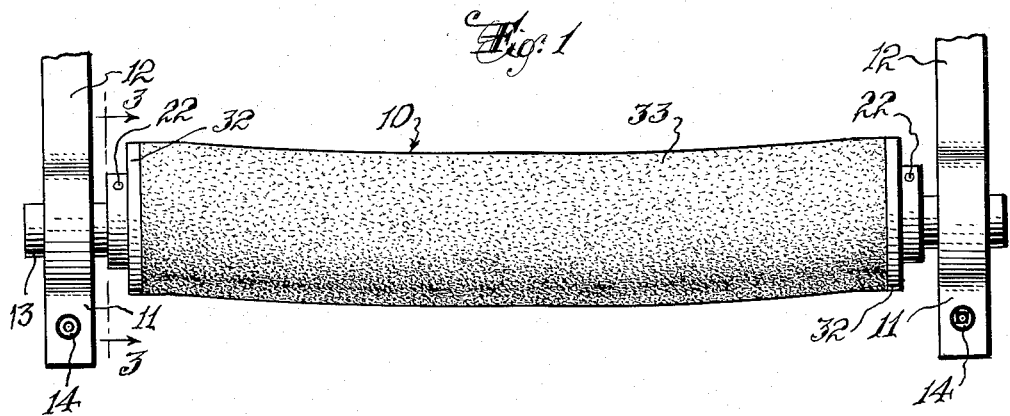
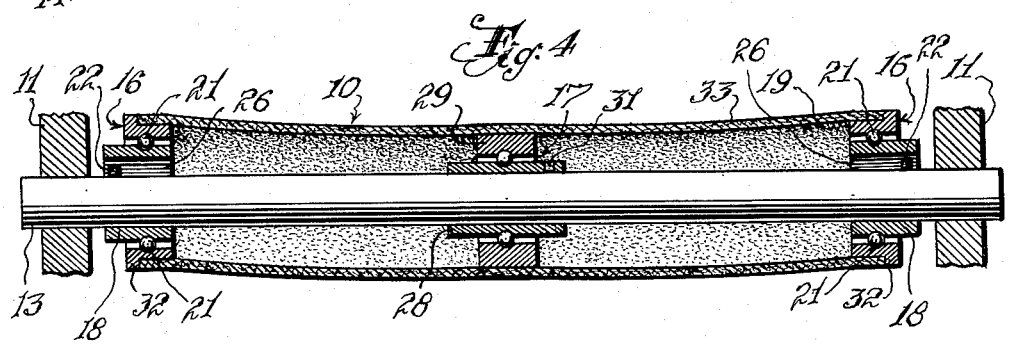
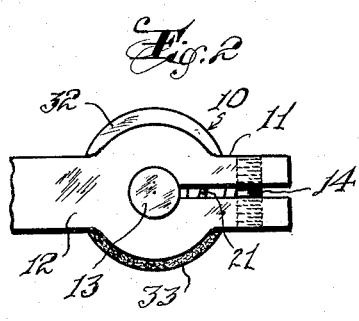   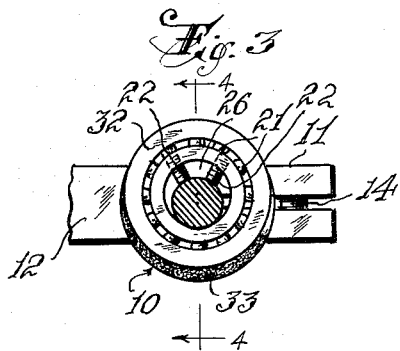
Inventor:
Roger W. Young
By Rudolph J. Jurick
Attorney United States Patent Office 2,996,784
Patented Aug. 22, 1961

2,996,784
CURVED ROLLER
Roger W. Young, Montclair, N.J., assignor to John Dusenbury Company, Inc., Verona, N.J., a corporation of New Jersey
Filed June 30, 1959, Ser. No. 824,005
7 Claims. (Cl. 26—63)

This invention relates to curved, or bowed, rolls of the type employed in the handling of traveling sheet material.

Rolls which are curved between the end portions thereof have utility for spreading traveling sheets of fabrics, paper, foil, film, and the like, to thereby eliminate wrinkles therein as the sheet makes initial contact at the concave side of the roll and leaves the same at the convex side in the course of travel of the sheet. When used in such a manner, the bowed roll is referred to as an expander roll since it has a spreading effect on the sheet. The same bowed roll may be used for contracting the width of the sheet, if desired, if the sheet makes initial contact at the convex side of the roll and leaves the same at the concave side thereof. Ordinarily, the shaft or axle supporting the bowed, rotatable roll is adjustably clamped in suitable supporting members whereby the curved axis of the roll may be adjustably positioned in any desired plane to obtain the desired degree of expanding or contracting action on the traveling web.

Curved rolls have utility in any of various devices used in the handling of and/or operating upon traveling sheets, or webs, such as, web slitting, perforating, and winding machines, or the like. Further, in any of the various devices utilizing rolls, the bowed roll may function as an idler roll wherein it is rotated by action of the traveling web thereon, a rider roll whereby it rides upon a rewind roll, for example, a driving roll which is suitably driven, or the like. Thus, it will be understood that the invention is directed to the curved roll, per se, and not to any particular use thereof.

Prior art bowed rolls generally comprise a curved shaft, or axle, upon which is rotatably mounted a plurality of adjacent bearing members. Ordinarily, a surface sleeve of rubber, or other resiliently flexible material, is positioned over the rotatably mounting bearing members. The ends of the curved shaft are adjustably clamped in suitably supported clamping members on the particular machine with which the curved roll is associated, and by rotatable adjustment of the shaft the curved axis of the roll may be positioned in any desired plane. All such prior art rolls are relatively expensive and most are subject to rapid wear. Plain, rather than ball or roller bearing members have been employed in such rolls in an effort to reduce the cost thereof. The frictional losses in the plain bearing members are much larger than the losses in the roller, or ball bearing members such that rollers employing plain bearing members present a relatively large resistance to turning thereby introducing heavy tensional strains in the web when the roll is web driven. The use of ball bearing members in the roll construction is therefore preferred. In the novel bowed roll of this invention, only three bearing members are required whereby the cost of the bearing members is small even when bearings of the ball bearing type are used.

Bowed or curved rolls are subject to substantial wear in service due, primarily, to the constantly changing contour of the surface sleeve and to the frictional effect of the traveling web thereon. In prior art rolls utilizing a rubber sleeve, generally the manufacturer alone is equipped to replace a worn sleeve since the job requires special tools, is difficult and is time consuming. In the bowed roller of this invention, a tube of cardboard, or other like composition, is utilized as the surface roll, which tube may be of identical construction as the tube or core upon which the web is to be wound, for example. It will be apparent that the cost of each tube is negligible. Further, the construction of the novel roll is such that a worn tube may be replaced, on the job, in a very short time.

A final important feature of this invention involves the use of a straight axle, or shaft, upon which the bearing members are mounted rather than a curve shaft such as is commonly used in prior art rolls. Not only is a straight shaft much cheaper than a shaft which must be curved but, also, a straight shaft results in a sturdier construction.

An object of this invention is the provision of a low cost curved roll which is sturdy and which has a minimum of parts.

An object of this invention is the provision of a curved roll which includes a tubular surface member made of cardboard, pressed board, or the like, which is inexpensive and which is easily replaced when worn.

An object of this invention is the provision of a curved roll comprising a pair of coaxial end bearings and an intermediate bearing having an axis displaced from the axis of the end bearings, a straight shaft upon which the bearings are mounted, and a flexible tube of cardboard, or the like, rotatably supported on the said bearings.

An object of this invention is the provision of a curved roll comprising a shaft, a pair of coaxial bearings mounted on the shaft adjacent the ends thereof, a third bearing mounted on the shaft intermediate the said pair of bearings, the axis of the said third bearing extending parallel with the axis of the pair of coaxial bearings at a spaced distance therefrom, and a sleeve mounted on the said bearings.

These and other objects and advantages will become apparent from the following description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views:

FIGURE 1 is a plan view of a curved roll embodying the invention;

FIGURE 2 is an end view showing the roll shaft mounted in one end clamp;

FIGURE 3 is a sectional view taken on line 3—3 of FIGURE 1; and

FIGURE 4 is a longitudinal sectional view of the roll taken on line 4—4 of FIGURE 3.

Reference is first made to FIGURE 1 of the drawings wherein the reference numeral 10 indicates generally a longitudinally curved roll mounted in end clamps 11, 11 integrally formed on arm members 12, 12. The roll comprises a shaft 13 clamped in the end clamps by tightening of the cap screws 14, 14. Unlike most prior art curved rolls, the shaft 13 is straight, and not curved. When the cap screws 14, 14 are loosened, the shaft 13 may be rotated in the end clamps about the shaft axis to place the curved axis of the roll in any desired plane. As seen in FIGURE 2, the end clamps 11, 11 may simply comprise bifurcated end members having an enlarged, generally cylindrical-shaped, opening therein for support of the shaft 13, the cap screws serving to clamp the shaft in the arms when the screws are tightened. The end clamps are simple and inexpensive as compared to prior art clamps necessary to support a curved shaft. Thence, it is not only cheaper to use a straight shaft than a curved shaft, but the straight shaft is easier to support for rotary adjustment.

Reference is made to the sectional views of FIGURES 3 and 4 wherein the internal construction of the novel curved roll is shown. It will be seen that the roll includes a pair of coaxial end bearing members 16, 16 and a center bearing member 17 mounted on the shaft 13. The bearing members illustrated are of the ball bearing type; ball bearings being preferred since a minimum of frictional losses are sustained therein. Each of the bearings 16, 16 include an inner and outer race member 18 and 19, respectively, relatively rotatably supported by the ball bearing elements 21. The axial length of the inner race 18 exceeds that of the outer race 19 whereby the inner race extends outwardly beyond one edge of the outer race. The inner race extension is provided with a pair of radially spaced tapped through holes for threaded support of set screws 22, 22. The use of two set screws in each of the inner race members is necessary to provide a stable three-point clamping connection of the race members 18 to the shaft 13 since it will be noted that the bore 26 of the race members 18 is of a greater diameter than the shaft 13 diameter (the shaft 13 having a diameter of 1¼", while the bore 26 in the inner race members has a diameter of 1½", for example). Upon tightening of the set screws 22, 22, the end bearings are secured to the shaft 13. It will be understood that the end bearings 16, 16 are coaxially mounted, and that due to the differences in the size of the shaft diameter and bearing bore the bearing axis extends a parallel spaced distance from the axis of the shaft 13.

The outer race members 19, 19 of the end bearings each include an annular radial outwardly extending flange 32 formed thereon. The outside diameter of the cylindrical shaped body portions of the outer races 19, 19 and 29 are of the same diameter, for the support of a tubular surface sleeve 33. The inside diameter of the sleeve 33 is substantially of the same diameter as the body portion of the outer race members 19, 19 and 29 for frictional engagement therewith. The sleeve abuts the flanges 32, 32 to prevent axial movement of the sleeve.

Unlike prior art bowed rolls wherein a rubber or rubber like sleeve is utilized, the sleeve 33 of this invention is made of very inexpensive material, such as cardboard, or the like. Thus, the cardboard tube 33 may be of the same construction as the cores upon which ribbons of material are wound, for example. It will be apparent that such cores of cardboard, or like material, are very inexpensive and readily available. In the use of cardboard sleeves it will be apparent that the curvature of the roll is limited to relatively large radii since cardboard rolls are incapable of short radius bends without failure, or collapse, thereof. With a tube length of several feet, for example, and with the axes of the end bearing members displaced ⅛" from the shaft axis (as in the above example wherein the shaft has a diameter of 1¼" and the end bearing inner race members have a 1½" bore) it will be apparent that the radius of curvature of the roll is small. Within a small deflection range, the cardboard is flexible and exhibits a small degree of resiliency.

No only is the curved roll of this invention very inexpensive of manufacture, but the cost of replacing a worn sleeve, or tube 33, is negligible. To replace a tube, the roll is removed from the end clamps 11, the two set screws 22 at one of the end bearings are loosened, and the end bearing and tube are slid off the shaft. The readily available and inexpensive cardboard core for use as the replacement sleeve is slipped over the bearings and the above described steps are repeated in a reverse order. Further, the width of the curved roll is easily adjusted by cutting the tube to the desired length, and positioning the bearings 16, 16 and 17 at suitable spaced distances along the shaft 13 to accommodate the tube length.

Having now described the invention in detail, in accordance with the requirements of the patent statutes, various changes and modifications will suggest themselves to those skilled in this art. For example, the roller construction may be changed by making the end bearing inner race bores 26 of substantially the same diameter as the shaft 13 for coaxial mounting therewith, and providing the center bearing member 17 with an enlarged inner race bore whereby the center bearing member bore axis is displaced from the shaft axis, rather than the end members. Further, antifriction bearings of the type other than the illustrated ball bearing members may be utilized in an embodiment of the invention. In addition, a suitable metallic, or rubber coated metallic sleeve, or the like, may be used in place of the cardboard sleeve 33. The use of the cardboard, or like material sleeve, is of particular advantage in order to keep the cost of the roll low. Further, such sleeves are readily available and easily replaced. It is intended that such changes and modifications shall fall within the spirit and scope of the invention as recited in the following claims.

I claim:

1. A curved roll comprising a shaft, a pair of coaxial bearings mounted on the shaft adjacent the ends thereof, a third bearing mounted on the shaft intermediate the said pair of bearings, each bearing comprising inner and outer race members relatively rotatably supported by bearing members, the axis of the said third bearing extending parallel with the axis of the pair of coaxial bearings at a spaced distance therefrom, and a sleeve mounted on the said bearings.

2. The invention as recited in claim 1 wherein the said sleeve comprises a cardboard tube.

3. The invention as recited in claim 1 wherein the said shaft is straight.

4. The invention as recited in claim 3 wherin the said third bearing is coaxially mounted with the shaft axis.

5. A curved roll comprising a rigid straight shaft, a pair of anti-friction end bearings each of which includes an inner race having a bore diameter larger than the shaft diameter, means coaxially mounting the end bearings at a spaced distance along the shaft with the end bearing axis extending parallel to the shaft axis at a spaced distance therefrom, a center bearing coaxially mounted on the shaft intermediate the said pair of end bearings, and a surface tube engaged over the said bearings.

6. The invention as recited in claim 5 wherein the said surface tube comprises a cardboard tube.

7. The invention as recited in claim 5 wherein the means mounting the end bearings on the shaft comprises a pair of set screws in each of the inner race members of the said end bearings and engaging the said shaft.

References Cited in the file of this patent

UNITED STATES PATENTS

| 2,114,378 | Gundlack | Apr. 19, 1938 |
| 2,817,940 | Lorig | Dec. 31, 1957 |